(12) United States Patent
Berthe et al.

(10) Patent No.: US 12,441,087 B2
(45) Date of Patent: Oct. 14, 2025

(54) LAMINATED GLAZING FOR A MOTOR VEHICLE, PARTICULARLY A SIDE GLAZING

(71) Applicant: SAINT-GOBAIN GLASS FRANCE, Courbevoie (FR)

(72) Inventors: Frédéric Berthe, Cambronne les Ribecourt (FR); Xavier Drouet, Marly la Ville (FR); Laurent Lamoureux, Montmort-Lucy (FR); Thibault Rapenne, Noyon (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 404 days.

(21) Appl. No.: 17/912,333

(22) PCT Filed: Mar. 23, 2021

(86) PCT No.: PCT/FR2021/050485
§ 371 (c)(1),
(2) Date: Sep. 16, 2022

(87) PCT Pub. No.: WO2021/191549
PCT Pub. Date: Sep. 30, 2021

(65) Prior Publication Data
US 2023/0158780 A1  May 25, 2023

(30) Foreign Application Priority Data
Mar. 25, 2020 (FR) ........................... 2002921

(51) Int. Cl.
B32B 17/10 (2006.01)
B32B 37/00 (2006.01)

(52) U.S. Cl.
CPC .. B32B 17/10064 (2013.01); B32B 17/10293 (2013.01); B32B 17/1055 (2013.01);
(Continued)

(58) Field of Classification Search
CPC ........ B32B 17/10064; B32B 17/10293; B32B 17/1055; B32B 37/003; B32B 2250/03;
(Continued)

(56) References Cited

U.S. PATENT DOCUMENTS

2001/0046595 A1* 11/2001 Moran ....................... C09J 7/22
428/212
2005/0144862 A1  7/2005 Jackson et al.
(Continued)

FOREIGN PATENT DOCUMENTS

CN  1671942 A   9/2005
CN  104476855 A  4/2015
(Continued)

OTHER PUBLICATIONS

International Search Report as issued in International Patent Application No. PCT/FR2021/050485, dated Jun. 28, 2021.
(Continued)

Primary Examiner — Maria V Ewald
Assistant Examiner — Ethan Weydemeyer
(74) Attorney, Agent, or Firm — Pillsbury Winthrop Shaw Pittman LLP

(57) ABSTRACT

A laminated glazing for a motor vehicle, particularly a side glazing intended to be slidably mounted in a door of the vehicle, includes at least one outer glass sheet and one inner glass sheet assembled by an interlayer which includes at least one sheet of polymer material, the glazing including at least one part for attaching the glazing provided with at least one attachment hole which has an axis and passes at least through the outer glass sheet, the attachment hole being intended to receive a system for attaching the glazing with a drive device, wherein the glazing includes at least one insert which, including a hole, is housed in a complementary cut-out provided in the interlayer, at the attachment part.

20 Claims, 11 Drawing Sheets

(52) U.S. Cl.
CPC ........ *B32B 37/003* (2013.01); *B32B 2250/03* (2013.01); *B32B 2307/536* (2013.01); *B32B 2307/732* (2013.01); *B32B 2605/00* (2013.01)

(58) Field of Classification Search
CPC ........ B32B 2307/536; B32B 2307/732; B32B 2605/00
See application file for complete search history.

(56) References Cited

U.S. PATENT DOCUMENTS

| | | | |
|---|---|---|---|
| 2006/0005482 A1* | 1/2006 | Bennison | B32B 17/10036 |
| | | | 52/204.5 |
| 2020/0114624 A1 | 4/2020 | Mannheim Astete et al. | |
| 2020/0156352 A1 | 5/2020 | Schall et al. | |

FOREIGN PATENT DOCUMENTS

| | | |
|---|---|---|
| CN | 109641423 A | 4/2019 |
| CN | 110494284 A | 11/2019 |
| WO | WO 2004/011755 A1 | 2/2004 |
| WO | WO-2018178882 A1 * | 10/2018 ....... B32B 17/10036 |

OTHER PUBLICATIONS

First Office Action as issued in Chinese Patent Application No. 202180003141.7, dated Sep. 14, 2022.

* cited by examiner

Fig.4 Fig.5 Fig.6 Fig.7

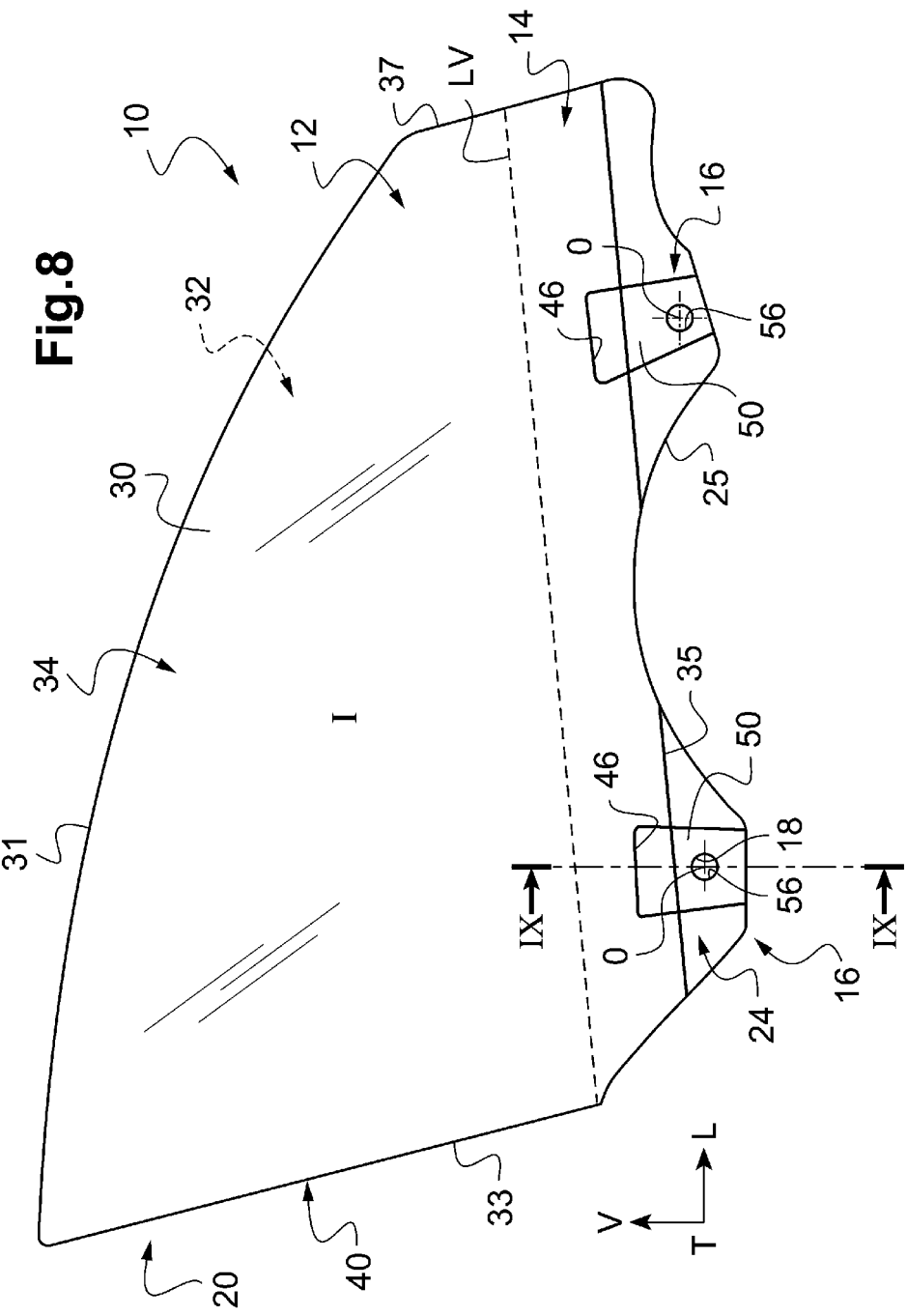

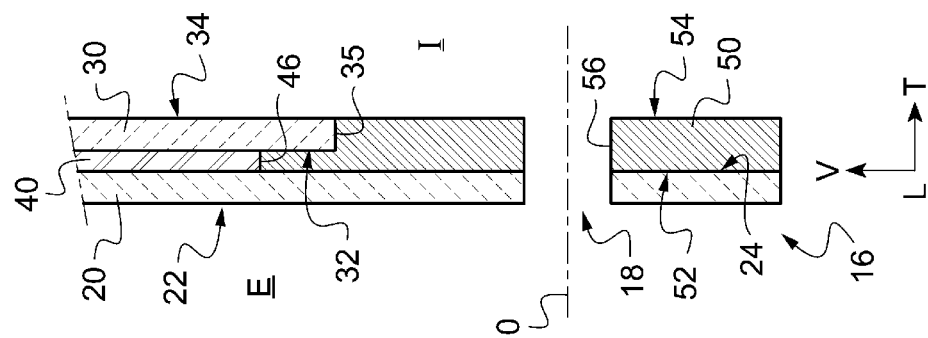
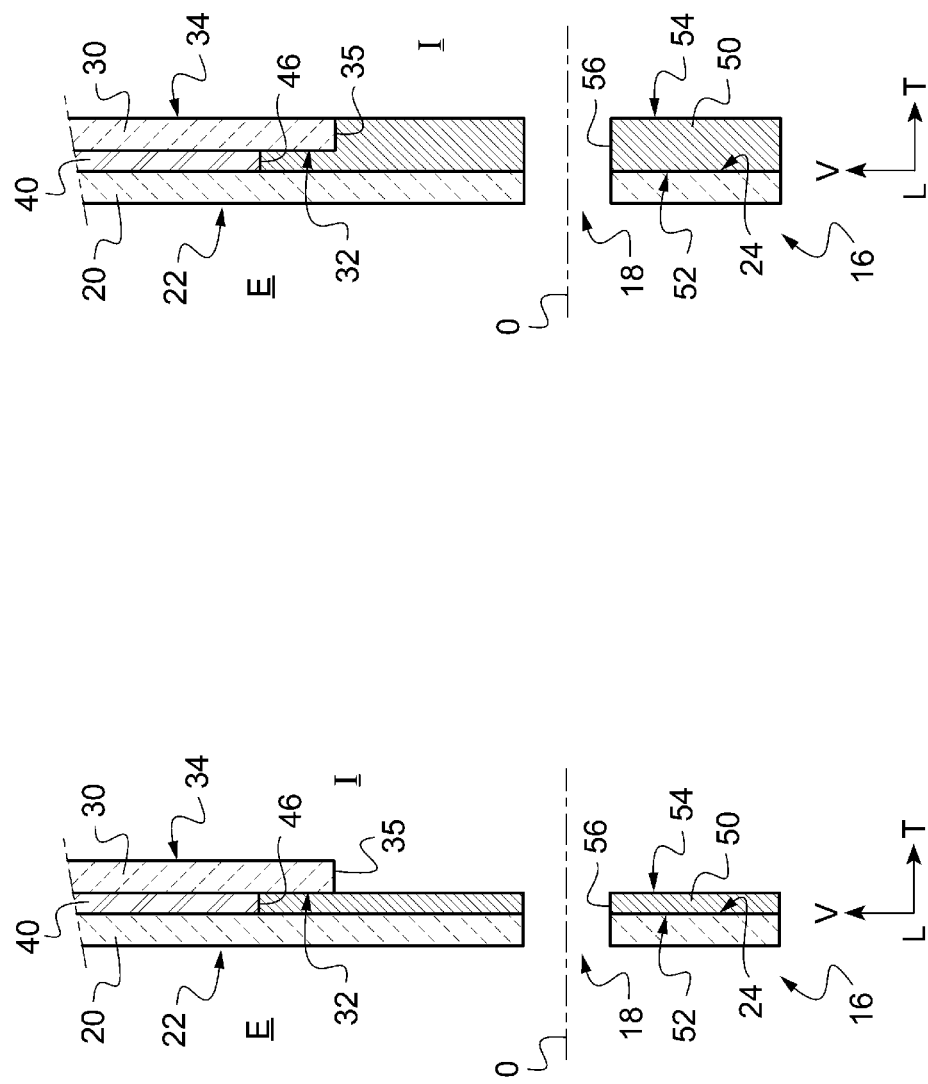

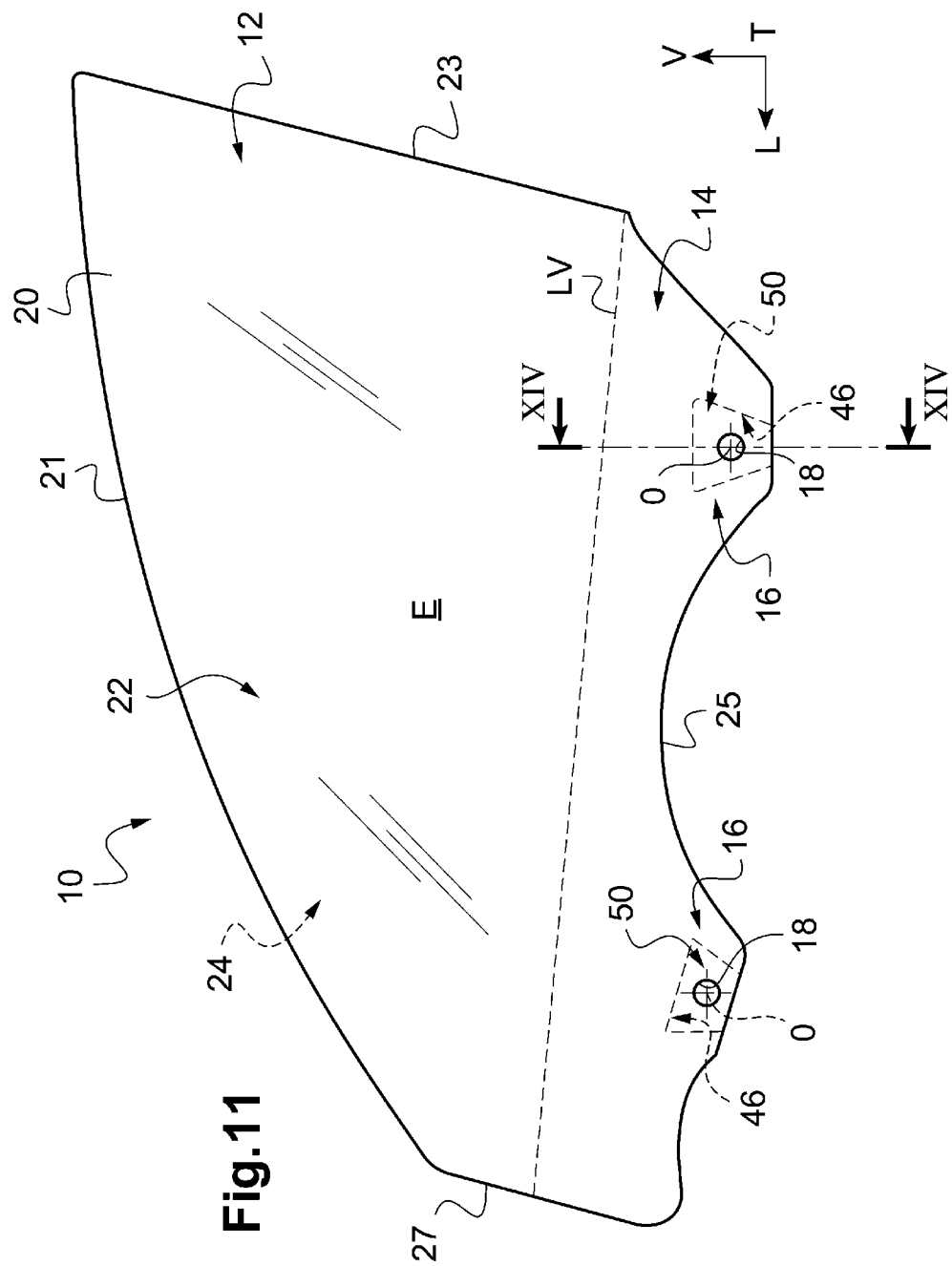

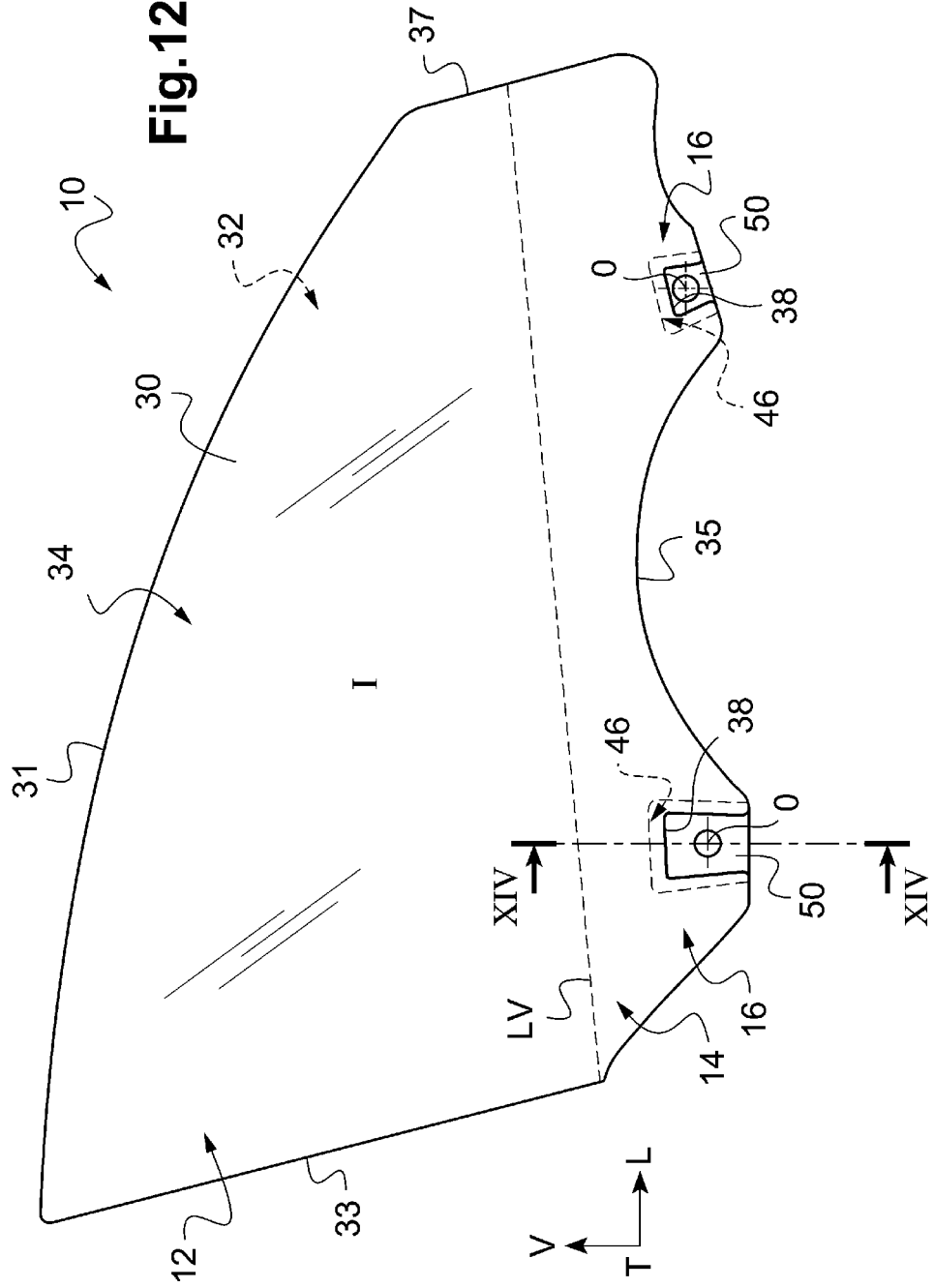

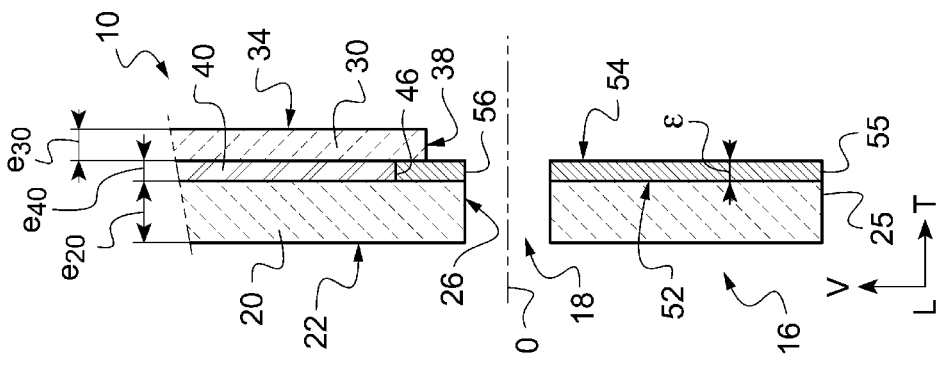
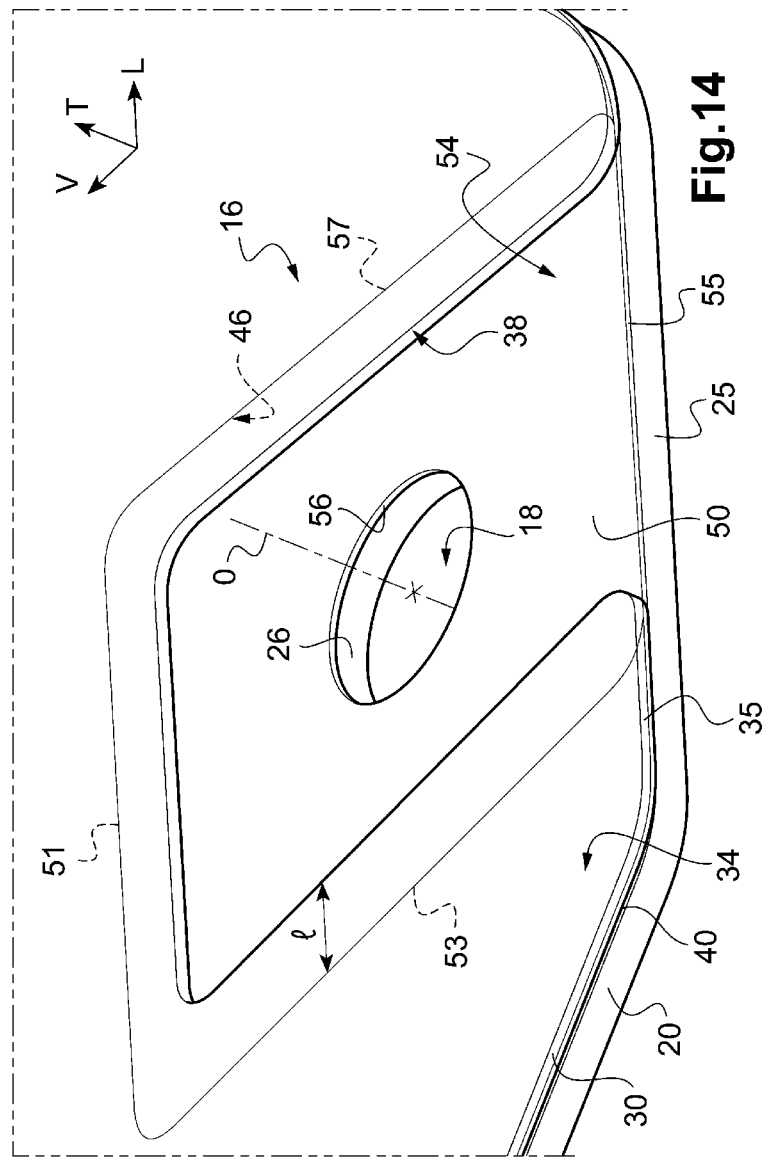

LAMINATED GLAZING FOR A MOTOR VEHICLE, PARTICULARLY A SIDE GLAZING

CROSS-REFERENCE TO RELATED APPLICATIONS

This application is the U.S. National Stage of PCT/FR2021/050485, filed Mar. 23, 2021, which in turn claims priority to French patent application number 2002921 filed Mar. 25, 2020. The content of these applications are incorporated herein by reference in their entireties.

TECHNICAL FIELD OF THE INVENTION

The invention relates to a laminated glazing for a motor vehicle, particularly a side glazing.

The invention relates more particularly to a laminated glazing for a motor vehicle comprising at least one outer glass sheet and one inner glass sheet assembled by an interlayer which comprises at least one sheet of polymer material, said glazing comprising at least one part for attaching the glazing provided with at least one attachment hole which comprises an axis and passes through at least the outer glass sheet, said attachment hole being intended for receiving means for attaching said glazing with a drive device.

The invention will be described more particularly for use in the automotive industry as a side glazing intended for being slidably mounted in the bodywork of a motor vehicle, in particular in a door of the vehicle, but is not however limited to such a use.

TECHNICAL BACKGROUND

Motor vehicle glazings are subject to increasingly stringent performance requirements that are often difficult to reconcile, such is particularly the case of side glazings.

In a motor vehicle, the side glazings are generally slidably mounted by means of a drive device inside the doors of the vehicle.

Such a side glazing comprises a visible zone and a non-visible zone which extend on either side of a limit of visibility, said non-visible zone located beneath the limit of visibility comprising a part for attaching the glazing which is connected to the drive device by the attachment means.

Furthermore, in some vehicles and in particular for aesthetic reasons, the doors do not comprise a frame around the side glazing, as is the case with some convertibles, which contributes to increasing the performance demands on the glazing, in particular in terms of safety in the event of crashes.

The English term "frameless" is used to refer to such doors in the motor vehicle industry.

In a known manner, the drive device of the side glazing is controlled selectively by means of a member, such as a crank or an electric button, to move the glazing heightwise with respect to the door, respectively between a closed position and at least one open position.

The side glazings of a vehicle are usually made up of more or less thick monolithic glass sheets. Such monolithic glazings are for example heated to a temperature of the order of 650° C. then rapidly cooled in order to temper them, generally while giving them a toric shape.

Monolithic (or tempered) glazings have the double advantage of being more resistant to mechanical stress and of fragmenting into a multitude of small pieces in the event of breaking. Such a fragmentation of the glazing, commonly referred to as "Securit fragmentation", additionally makes it possible to comply with the very precise specifications of international standard R43.

Compared to such a monolithic glazing, a laminated glazing comprises an outer glass sheet and an inner glass sheet which are assembled by an interlayer comprising at least one sheet of polymer material, such as at least one sheet of polyvinyl butyral (PVB).

Motor vehicle manufacturers seek, particularly for the most sophisticated vehicles, side glazings offering the best existing properties such as in particular qualities of sound attenuation, break-in resistance, athermal properties particularly with respect to UV type solar radiation, etc.

This is one of the reasons why it is increasingly sought to use laminated glazings as side glazings in a motor vehicle.

Indeed, laminated glazings make it possible to improve acoustic comfort due to the absorption properties of the interlayer comprising at least one sheet of polymer material, such as polyvinyl butyral (PVB).

Laminated glazings also offer better break-in resistance as well as new properties such as blocking the UV radiation coming from the sun.

However, the use of such laminated glazings is not free of certain problems.

One of the problems is being able to obtain a laminated glazing having characteristics, in particular of mechanical behavior such as resistance, equivalent to those of a monolithic glazing. This is particularly important when interchangeability between the two types of glazing of a given thickness is sought, in order to be able to substitute them.

In fact, the glass sheets that make up the laminated glazing do not reach the same stress levels as monolithic glazings, particularly because of their reduced thickness which does not allow a sufficient thermal gradient to be created during cooling to generate the stresses necessary for obtaining an equivalent mechanical resistance, particularly to bending.

This is the reason why such laminated glazings are also referred to as "hardened" or "semi-tempered" as opposed to the "tempered" designation commonly used for monolithic glazings.

The use of a laminated glazing as side glazing does not pose a safety problem in itself since the sheet of polymer material of the interlayer ensures the cohesion of the assembly in the case of an accident and thus avoids the projection of pieces of glass capable of causing injuries. Compared to a monolithic glazing, it is not necessary to obtain securit fragmentation with a laminated glazing.

However, in addition to their characteristics of mechanical behavior, laminated glazings generally differ from monolithic glazings in terms of their attachment, via attachment means, to the drive device.

To provide the connection of a side glazing with the drive device housed in the door, different types of links are known from the background art.

A first type of connection by bonding is known wherein the attachment means comprise for example at least one connecting part or a pair of connecting parts which are attached by bonding to the glazing in order to movably connect the glazing to the drive device.

According to one exemplary embodiment of attachment means used for this first type of connection, the attachment means comprise at least one Y-shaped connecting part (referred to as "holder") which, on the one hand, is attached to said glazing by bonding and, on the other hand, is connected to the drive device, generally by screwing or another equivalent means.

The Y-shaped connecting part comprises for example two flanges which are each attached by bonding to one of the internal and external faces of the glazing, respectively.

The Y-shaped connecting part is arranged in the vicinity of the lower edge located below the limit of visibility, that is in the non-visible zone concealed in the door, in order to movably connect the side glazing to the drive device.

This first type of connection by bonding still needs the implementation of at least one specific bonding step, following the assembly of the laminated glazing. In industrial terms, the implementation of such a bonding step is still delicate, particularly controlling the amount of adhesive or even the time required for the adhesive to securely attach the connecting part to the glazing. Moreover, bonding sometimes poses problems in terms of resistance over time.

A second type of connection is also known wherein the attachment means are connected to the glazing by pinching a part of the glazing, only by the outside.

The attachment means for such a second type of connection are for example similar to those described previously in that they comprise particularly at least two parts which are arranged on either side of a glazing located in the non-visible zone.

The two parts that provide the pinching are for example assembled with one another below the glazing, generally by screwing. Thus, the parts are clamped together at one of their ends and such as to, at their other end, pinch the external and internal faces of the glazing with a clamping force capable of guaranteeing the movable connection between the glazing and the drive device.

If, compared to the first type of connection, this second type of connection makes it possible to eliminate the bonding step, the associated attachment means sometimes have a size that is considered to be large, particularly vertically, which contributes to limiting their use. Furthermore, the clamping force applied by such attachment means according to this second type of connection is considerable so that, with time, the polymer material forming the interlayer may creep and affect the attachment.

It is noted however that the first type and the second type of connection have in common that they do not require one or more attachment holes to be provided in the glazing as is the case with the attachment means of the third type of connection that is described hereunder.

Furthermore, this (absence of holes) is one of the reasons why these first and second types of connection are used in the vast majority of cases for laminated glazings.

Indeed and by comparison, the third type of connection is additionally characterized in that one or more attachment holes are provided in the glazing and are intended for receiving a part of the attachment means associated with the glazing.

The attachment means for this third type of connection comprise for example parts arranged on either side so as to clamp the glazing by the outside (as in the second type).

According to a feature specific to this third type of connection, the parts of the attachment means are connected to one another through the attachment hole which is provided in the glazing, generally connected by screwing or any other equivalent means.

Such attachment means comprise for example an axis that passes through the attachment hole provided in the glazing.

Due to the one or more attachment holes that the glazing must comprise, this third type of connection is, on the contrary, that which is commonly used for monolithic glazings.

The one or more attachment holes are indeed advantageously made in the monolithic glazing before tempering so that no step is needed after forming the glazing in order to provide its attachment to the drive device.

Moreover and compared to the first and second type of connection, the fact that the attachment means pass through the glazing is also advantageous in terms of safety, in particular because it guarantees that the glazing remains connected to the drive device in the event of a crash or crashes.

Thus, the choice of the first type of connection and of the second type of connection in the case of laminated glazings and of the third type of connection in the case of monolithic glazings is particularly the result of characteristics specific to each of the glazings.

Nevertheless, the choice of attachment means of a given type of connection depending on the type of glazing is no longer the only factor to be taken into account, other factors have led to the evolution of what has just been presented.

A standardization of the drive device is in particular increasingly sought after nowadays by motor vehicle manufacturers in order to be able to mount a monolithic type or laminated type side glazing indifferently in the door of a vehicle, particularly of the same model, that is to have glazings that are interchangeable.

This is one of the reasons why it has been sought to apply to laminated-type side glazings the third type of connection, commonly used with monolithic-type side glazings, and requiring at least one attachment hole in the glazing.

In the case of this third type of connection, the glazing comprises at least one perforated attachment part, sometimes two separate attachment parts according to the glazing, which are made in the non-visible zone located below the limit of visibility.

As indicated previously, the one or more attachment parts therefore comprise at least one attachment hole provided through the glazing. The attachment hole opening onto the two faces of the glazing is intended to receive attachment means, said attachment means applying clamping forces onto the attachment part and being connected to the drive device.

The laminated glazing according to the present invention is intended for use with such a connection of the third type and thus comprises at least one attachment part comprising one or more attachment holes configured to receive means for attachment with the drive device of the glazing.

Compared to a connection of the first type, such a connection of the third type with a perforated glazing makes it possible particularly to eliminate any bonding operation between the glazing and the attachment means.

Compared to a connection of the second type, such a connection of the third type additionally makes it possible to save space.

However, the implementation of the third type of connection with attachment hole with a laminated glazing poses problems linked to the characteristics of mechanical behavior of a laminated glazing, which problems furthermore explain the fact that the first or second type of connection is still the attachment solution that is used in the vast majority of cases with such laminated glazings.

Firstly, the glass sheets of a laminated glazing intended for a motor vehicle are thin, typically less than 2.6 mm thick in the case of the glass sheets of a symmetric glazing. This is the reason why it is not possible to apply to same a tempering operation equivalent to that implemented for a monolithic glazing.

The consequence recited previously in connection with the mechanical behavior is that a laminated glazing has lesser characteristics than those of a monolithic glazing, especially in terms of stress and impact resistance.

And yet, such stresses and such impacts are applied to the one or more parts for attaching the glazing on the one hand by the attachment means themselves due to the clamping and, on the other hand, during use, for example when the door is slammed.

Moreover, the one or more attachment holes made in each of the glass sheets (before forming the laminated glazing) are then mismatched during the assembly operation with the interlayer and this due to the different radii of curvature between the outer and inner faces. Indeed, a side glazing is generally curved to match the profiled shape of the bodywork of the motor vehicle.

This phenomenon of mismatch (or misalignment) between the holes provided in each of the glass sheets of the laminated glazing to obtain an attachment hole is also referred to as "mismatch".

This mismatch phenomenon additionally has the consequence of not allowing a good take-up, a good distribution, of the forces on each of the glass sheets of the laminated glazing.

In an attempt to address these problems, solutions have been proposed.

One of the solutions consists of using an insert which, inserted into the attachment hole, passes right through the glazing to which it is attached by bonding. Document CN104476855 shows in a non-limiting manner an exemplary embodiment of an insert according to this solution.

Another solution consists of a specific design of the laminated glazing which, referred to as "asymmetric", is characterized by the fact that at least the inner glass sheet, which is shorter, does not cover the one or more other sheets of the glazing at the attachment part.

Thus, an asymmetric glazing comprises an inner glass sheet through which the attachment means (of the glazing with the drive device) do not pass since said inner glass sheet does not comprise an attachment hole, by virtue of which there is no longer a problem of mismatch.

The inner glass sheet of such an asymmetric glazing is therefore connected to the drive device only by means of the other sheets of the glazing, that is indirectly via the interlayer due to the assembly of the sheets that make up the laminated glazing.

In mechanical terms, an asymmetric laminated glazing is thus attached to the drive device essentially by the outer glass sheet, which thus is generally thicker.

The solutions of the background art presented previously reveal various shortcomings which the present invention aims to resolve.

Firstly, many of these solutions involving holder-type parts require at least one bonding operation to be carried out after the laminated glazing has been manufactured, impacting on the manufacturing process and involving additional costs.

Secondly, the above-mentioned solutions imply a variation in the overall size of the part for attaching the laminated glazing. In fact, either an overthickness is created due to the use of attachment means, or conversely an underthickness is created in the case of an asymmetric glazing.

The increase in the overall size has a negative impact on logistics costs, affecting transport and storage costs.

Thus, the known solutions do not make it possible to offer motor vehicle manufacturers the desired interchangeability between monolithic glazing and laminated glazing as side glazing, which by allowing a standardization of the means for attachment, with the drive device, even of the sealing means associated with the glazing, is an important lever for cost reduction.

Finally, problems were mostly observed with the durability of the laminated glazing with creep of the polymer material of the interlayer occurring as a result of the clamping forces applied by the attachment means on either side of the glazing, around the attachment hole.

To give an order of magnitude, the clamping forces can reach values of the order of 1 to 2 tonnes.

And yet, such a creep of the polymer material of the interlayer has the consequence of modifying the bearing surface of the attachment means. Thus, this creep is likely to lead to an unexpected breakage of the attachment part or to result in a lack of rigidity of the glazing due to the reduction of the clamping forces, which is then particularly detrimental in the case of a frameless door.

Furthermore, given the forces involved, the glass is also capable of breaking initially when the attachment means are tightened, generally by screwing, due to the concentration of stress.

This limits the design freedom of the laminated glazing as a minimum thickness is required to prevent such breakage, for example a thickness of at least 1.6 mm is considered necessary.

The present invention particularly aims to solve the shortcomings of the background art, more particularly to propose a laminated glazing having improved characteristics in terms of mechanical behavior, which is interchangeable with a monolithic glazing connected to a drive device by attachment means, and this without requiring any additional operation.

SUMMARY OF THE INVENTION

To this end, the invention proposes a laminated glazing of the type described previously, characterized in that the glazing comprises at least one insert which, comprising a hole, is housed in a complementary cut-out provided in the interlayer, at the attachment part.

According to the invention, the interlayer comprises at least one cut-out which is provided in the non-visible zone of the interlayer corresponding to the part for attaching the glazing and which is intended to receive at least one insert.

Advantageously, at least one part of the insert is in contact with the interlayer, with the perimeter of the cut-out.

Advantageously, the insert comprises a hole intended for the means for attaching the glazing with the drive device to pass through same.

Preferably, said hole provided in the insert is configured to be aligned with the axis of the attachment hole of the glazing.

Advantageously, the insert comprising the hole is housed in the cut-out during the assembly of the laminated glazing, that is of the outer glass sheet and of the inner glass sheet via the interlayer incorporating at least one insert.

Preferably, the insert and the interlayer are connected together beforehand to form a unitary subassembly in order to facilitate the assembly with the glass sheets.

According to one variant, the insert does not initially comprise a hole, the hole is made in the insert by any appropriate means after the assembly of the laminated glazing, particularly but not exclusively when the insert comprises a core.

Advantageously, the insert is configured to comprise at least one holding surface intended to engage with the cut-out of complementary shape of the interlayer particularly in order to improve the retaining of the glazing, both before and in the event of breakage.

The cooperation of shapes between the insert and the interlayer actually helps retain the laminated glazing, the holding surface of the insert in contact with the polymer material of the interlayer opposing most particularly the vertical orientation forces, that is the generally dominant orientation of the forces particularly due to the fact that the glazing is guided vertically in rails.

Preferably, the insert has for example a trapezoidal shape, said insert being oriented vertically so that the upper end is the widest by virtue of which the holding surface is formed by the oblique edges of the insert in contact with those of the cut-out of the interlayer.

Advantageously, said insert is made of a material chosen to have a hardness which is greater than that of polyvinyl butyral (PVB), which is preferably used as polymer material in the interlayer, by virtue of which the problems of creep of the polymer material of the interlayer that are caused particularly by the clamping forces applied locally by the attachment means are solved.

Advantageously, the insert forms a spacer in order to limit the creep of the polymer material at the part for attaching the glazing stressed by the attachment means.

Preferably, the insert is configured to have a lateral surface which is larger than or equal to that of the attachment means particularly applying said clamping forces so that the clamping forces are taken up entirely by the insert arranged in the part for attaching the laminated glazing.

Advantageously, the transmission of the forces is optimized by virtue of the insert, in particular that of the clamping forces, by virtue of which the laminated glazing has better stability, the risk of creep of the polyvinyl butyral (PVB) being reduced due to the suppression of the stress that was causing same.

Advantageously, the laminated glazing comprises one or more chamfers formed at the attachment hole intended to receive the attachment means.

Preferably, the outer glass sheet comprises at least one hole which is chamfered at one and/or the other of the outer and inner faces thereof.

Preferably, the inner glass sheet comprises at least one hole which is chamfered at one and/or the other of the outer and inner faces thereof.

Advantageously, the one or more attachment holes occupy in the laminated glazing a position identical to that occupied in a monolithic glazing in order to offer perfect interchangeability between the two types of glazing without requiring any modification or adaptation.

Advantageously, the laminated glazing comprising at least one insert according to the invention has the same total thickness as the monolithic glazing with which it is interchangeable.

In a non-limiting manner, for a monolithic glazing having a total thickness of 4.85 mm, the laminated glazing comprises for example an outer glass sheet and an inner glass sheet having respective thicknesses of 2.1 mm and assembled by at least one sheet of the interlayer having a thickness of 0.65 mm, the insert having a thickness substantially equal to that of the interlayer.

The attachment means and the associated drive device are thus capable of being standardized by a manufacturer, by virtue of which it is possible to reduce the costs and to simplify the production.

Advantageously, said at least one insert comprising the hole is included in the laminated glazing during manufacturing, that is housed in the cut-out of the interlayer located between the outer glass sheet and the inner glass sheet, so that no additional operation is required, particularly no operation of bonding the insert after manufacturing.

Advantageously, the insert is able to transmit to the attachment means the forces that arise particularly in the event of crashes and most particularly in the attachment part, thus helping to guarantee the retaining of the laminated glazing.

Advantageously, the insert is arranged only in the non-visible zone of the glazing so that the material that constitutes the insert can be freely chosen, particularly depending on the sought characteristics of mechanical behavior, most particularly of hardness.

Advantageously, the insert makes it possible to reinforce, locally at the attachment part, the resistance of the laminated glazing. Compared to the background art, said resistance of the glazing to clamping forces is particularly no longer limited by the hardness of the sheet of polymer material forming the interlayer, typically that of the polyvinyl butyral (PVB).

The insert advantageously helps to reinforce the rigidity of the part for attaching the glazing in combination with at least the outer glass sheet through which the attachment hole passes, or else in combination with the outer glass sheet and the inner glass sheet for a symmetric-type laminated glazing.

The insert is rigidly connected to the laminated glazing without requiring bonding, all or at least part of the insert being clamped between the outer glass sheet and the inner glass sheet of the glazing.

In the attachment part to which the attachment means apply a clamping force, in the absence of an interlayer due to the cut-out, the insert is directly in contact with each of said glass sheets without positioning therebetween any material capable of creeping such as the polymer material of the interlayer or even adhesive.

The laminated glazing is connected to the drive device by attachment means which pass through at least the outer glass sheet and the insert, and even also the inner glass sheet.

According to Other Characteristics of the Invention

- the insert comprises an outer face which is in direct contact with an inner face of the outer glass sheet and an inner face of which all or at least one part is in direct contact with an outer face of the inner glass sheet;
- the insert is made of a material having a hardness greater than that of the interlayer comprising at least said sheet of polymer material, particularly a sheet of polyvinyl butyral (PVB), said material of the insert having for example a Shore D hardness comprised between 70 and 90;
- said insert is made of a plastic material, particularly polyamide (PA), for example PA 6-6, polyoxymethylene (also referred to as polyformaldehyde or polyacetal) (POM), polybutylene terephthalate (PBT), polyethylene terephthalate (PET), or a metal material, for example steel;
- the hole is formed in the insert after assembling said sheets of the glazing;

the hole of the insert has a diameter comprised between 10 mm and 30 mm, preferentially between 15 mm and 25 mm;

the insert comprises a bushing which, extending according to the axis O, is configured to pass through at least part of the outer glass sheet provided with a hole and/or of the inner glass sheet provided with a hole;

the insert comprises a core projecting with respect to one and/or the other of the outer and inner faces of the insert, said core being intended to be bored so as to form the bushing through which said hole passes, preferentially bored after assembling said sheets of the glazing;

the insert has a thickness which is equal to more or less 10% of the thickness of the interlayer, preferentially equal to more or less 5% of the thickness of the interlayer and even more preferentially to more or less 2% of the thickness of the interlayer;

the interlayer is configured to form a spacer between the outer glass sheet and the inner glass sheet so as to limit the creep of the polymer material of said at least one sheet of the interlayer, particularly during the assembly of the glazing or during the use of the laminated glazing as side glazing;

the inner glass sheet comprises at least one cut-out provided in the part for attaching the glazing so that the attachment means engage with the insert without contact with said glass sheet;

the cut-out of the inner glass sheet has dimensions smaller than those of the insert so that the insert engages around said cut-out with a part of an outer face of the inner glass sheet;

the insert comprises at least one part configured to form a holding surface capable of retaining it vertically in position, said insert having for example a trapezoidal shape or T shape;

the laminated glazing is of the symmetric type, said at least one part for attaching the glazing comprising the outer glass sheet, the insert and the inner glass sheet;

the insert comprises de-airing means configured to allow a discharge of the air contained in the interlayer during the assembly of the laminated glazing;

said at least one part for attaching the glazing comprises at least the outer glass sheet and the insert, not covered by the inner glass sheet;

the outer glass sheet comprising an outer face and an inner face, the outer glass sheet comprises at least one hole which is chamfered on one and/or the other of said faces;

the inner glass sheet comprising an outer face and an inner face, the outer glass sheet comprises at least one hole which is chamfered at one and/or the other of said faces.

BRIEF DESCRIPTION OF THE FIGURES

Further characteristics and advantages of the invention will become apparent upon reading the following detailed description, for the understanding of which reference is made to the appended drawings, wherein:

FIG. 4 is a cross-sectional view according to the plane IV-IV depicted in FIGS. 1 and 2 which depicts the rear one of the parts for attaching the laminated glazing according to the first embodiment and which shows the insert comprising a hole aligned with the axis O and intended for having the attachment means passing through same;

FIG. 5 is a cross-sectional view analogous to that of FIG. 4 which depicts one of the parts for attaching the laminated glazing and which shows a first alternative embodiment of the insert wherein the insert comprises a bushing that extends laterally inside the attachment hole on a single side, herein through the inner glass sheet;

FIG. 6 is a cross-sectional view similar to that of FIG. 4 or 5 which depicts one of the parts for attaching the laminated glazing and which shows a second alternative embodiment of the insert wherein the insert comprises a bushing which extends transversely on either side, inside the attachment hole, through the outer glass sheet and the inner glass sheet, respectively;

FIG. 7 is a cross-sectional view which, similar to that of FIGS. 4 to 6, depicts one of the parts for attaching the laminated glazing and which shows a third alternative embodiment of the insert wherein the insert comprises a core projecting on either side and capable, after assembly, of being bored in order to obtain a bushing analogous to that of FIG. 6;

FIG. 8 is a side view which depicts, from the inside, the laminated glazing according to a second embodiment of the laminated glazing and which additionally shows the two parts for attaching the laminated glazing each comprising an insert housed in a cut-out of the interlayer and visible by transparency, said attachment parts not being covered by the inner glass sheet of the side glazing which is of the asymmetric type;

FIG. 9 is a cross-sectional view according to the plane IX-IX depicted in FIG. 8 which depicts a rear one of the parts for attaching the laminated glazing according to FIG. 8 and which shows the insert (analogous to that of FIGS. 1 to 4) of which at least one upper part is covered by the inner glass sheet;

FIG. 10 is a cross-sectional view which, analogous to FIG. 9, depicts a rear one of the parts for attaching the laminated glazing and which shows an alternative embodiment of an insert having a stepped shape of which at least one thicker part is configured to extend transversely below the inner glass sheet of the asymmetric-type side glazing so that the thickness of the part for attaching the glazing is identical to that of the rest of the glazing;

FIG. 11 is a side view which, similar to FIG. 1, depicts from the outside a symmetric-type laminated glazing for a motor vehicle according to a third embodiment wherein a cut-out is provided in the inner glass sheet and which shows the outer glass sheet of the laminated glazing comprising in its non-visible zone two attachment parts each comprising an insert housed in a cut-out of the interlayer, analogous to that of the first embodiment, and visible by transparency through the outer glass sheet;

FIG. 12 is a side view which depicts, from the inside, the laminated glazing according to FIG. 10 of which the attachment parts are covered by the inner glass sheet except locally in the zone corresponding to said cut-out and which shows the two parts for attaching the laminated glazing each comprising an insert made partly visible due to said cut-out provided in the inner glass sheet;

FIG. 14 is a perspective view which depicts in detail one of the parts for attaching the glazing and which shows the cut-out provided in the inner glass sheet which is configured to have dimensions smaller than those of the insert;

FIG. 15 is a cross-sectional view which depicts a rear one of the parts for attaching the laminated glazing according to FIGS. 11 to 14 and which shows the cut-out provided locally in the inner glass sheet and the insert housed in the cut-out that the interlayer comprises;

DETAILED DESCRIPTION OF THE INVENTION

In the following detailed description, the longitudinal, vertical and transverse orientations are used in a non-limiting manner in reference to the 3D coordinate system (L, V, T) depicted in the figures.

By convention, the description will use the terms "front" and "rear" in reference to the longitudinal orientation, the terms "upper" and "lower", or "top" and "bottom", in reference to the vertical orientation and the terms "outer" and "inner" or "external" and "internal" in reference to the transverse orientation of said 3D coordinate system (L, V, T).

In the rest of the description, the embodiments and/or alternatives of the invention will be advantageously described by comparison and, in the figures, elements that have equivalent functions or identical structures will be denoted by the same reference.

In FIGS. 1 to 4 a first embodiment of a laminated glazing 10 for a motor vehicle according to the invention has been depicted.

The laminated glazing 10 according to the invention will be described by way of non-limiting example in the context of a use as side glazing.

Such a side glazing is intended to be slidably mounted, according to the vertical orientation, in a door (not shown) of the vehicle. The side glazing is intended to close a window opening comprised in the door of the vehicle.

In such an application for a motor vehicle, the glazing 10 thus provides a separation between a space E which is outside the vehicle and an inside space I which is inside the vehicle. Thus, the terms "outer" and "inner" applied hereunder to the laminated glazing 10 are done so in accordance with this notion of outside space and inside space.

FIGS. 1 to 4 show more particularly said laminated glazing 10 consecutively in a side view from the outside and from the inside and then exploded and, partially, in cross-section.

The laminated glazing 10 comprises a so-called visible zone 12, and a so-called non-visible zone 14, which extend on either side of a limit of visibility LV of the glazing, the non-visible zone 14 corresponding to a lower part of the glazing permanently concealed inside the door.

Figure 1:
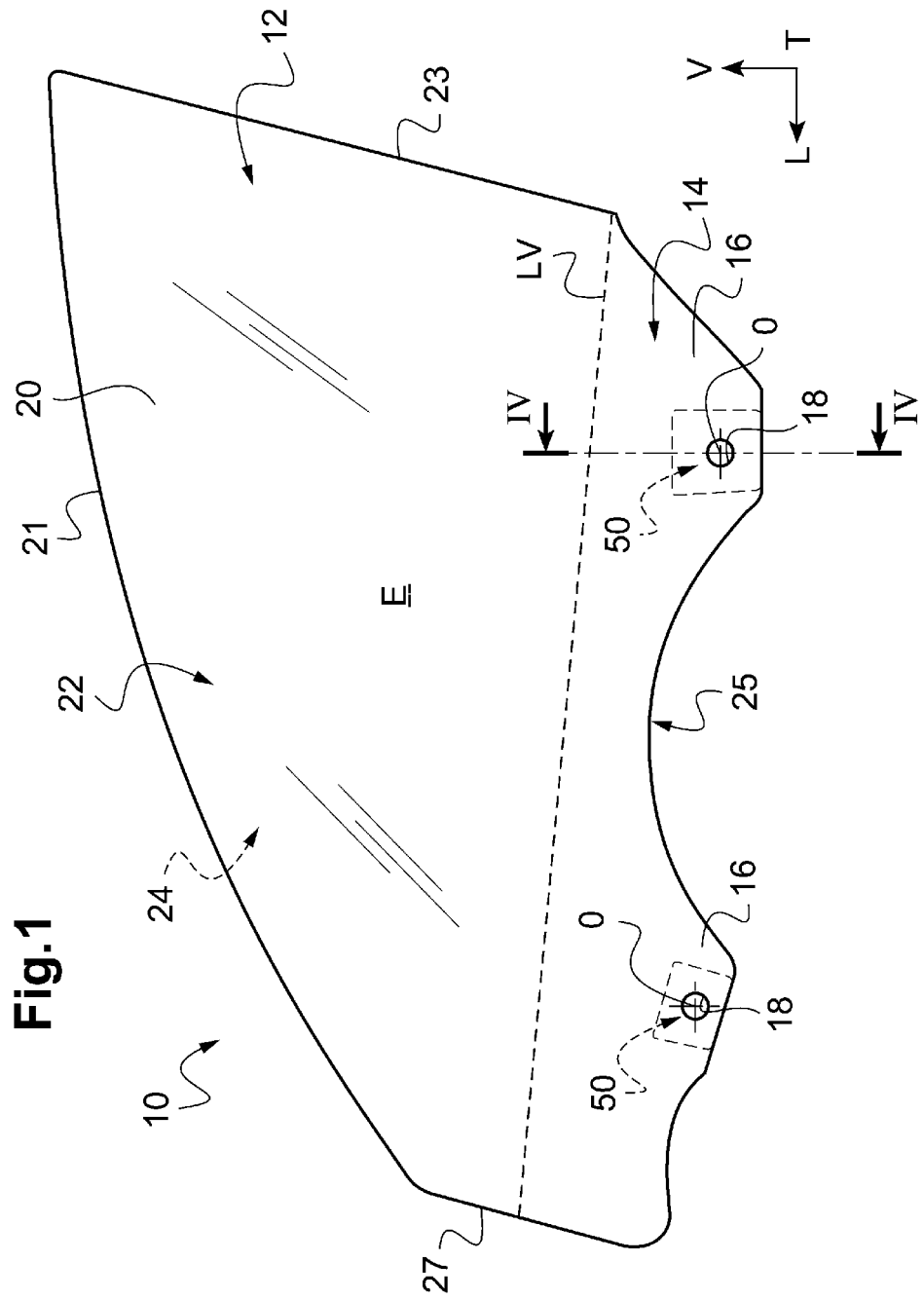
FIG. 1 is a side view which depicts, from the outside, a laminated glazing for a motor vehicle according to a first embodiment and which shows the outer glass sheet of the laminated glazing comprising in its non-visible zone two front and rear attachment parts each provided with an attachment hole intended to receive means for attaching the glazing with a drive device, said attachment parts each comprising an insert housed in a cut-out of the interlayer and visible by transparency through the outer glass sheet.
Figure 2:
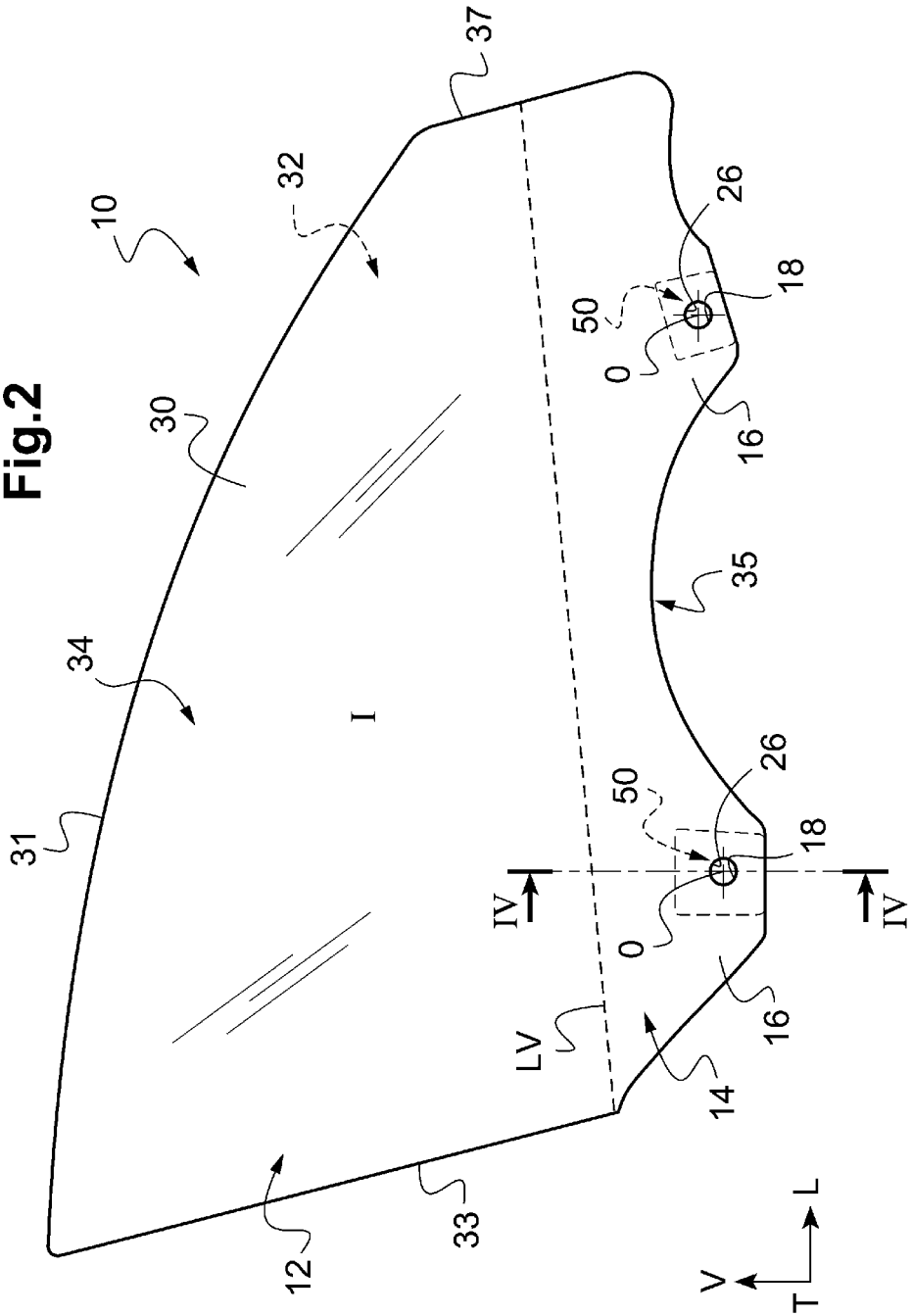
FIG. 2 is a side view which depicts, from the inside, the laminated glazing according to FIG. 1 and which additionally shows the two parts for attaching the laminated glazing each comprising an insert housed in the cut-out of the interlayer and visible by transparency, said attachment parts being covered by the inner glass sheet to form a symmetric-type side glazing.

In FIGS. 1 and 2 the limit of visibility LV has been depicted in dotted lines in order to materialize it.

The limit of visibility LV generally corresponds to the position of a licking seal mounted integrally with the door, said licking seal being arranged to engage with the laminated glazing 10, in particular when said glazing 10 is slidably mounted relative to the door.

The laminated glazing 10 comprises, in said non-visible zone 14 located below the limit of visibility LV, at least one attachment part 16 which comprises at least one attachment hole 18 intended to receive means for attaching the glazing 10 with a drive device (not shown) of said glazing 10.

The laminated glazing 10 comprises at least one attachment hole 18 which has an axis 0 oriented transversely according to the 3D coordinate system (L, V, T) depicted in the figures.

The attachment means between the glazing 10 and the drive device comprise for example at least one axis intended to pass through the part 16 for attaching the glazing 10 via said at least one attachment hole 18. The attachment means associated with the glazing 10 are for example means for attachment by screwing in order to perform a connection of the third type according to the background art presented previously.

In a known manner, such attachment means are configured to be rigidly connected to the glazing 10, applying clamping forces on each of the attachment parts 16 transversely due to the screwing.

The drive device (sometimes referred to as "window lift") is controlled selectively to move said glazing 10, according to a translation movement, heightwise between at least one high, so-called closed, position of the door window opening and a low, so-called open, position of all or part of said window opening.

According to the first embodiment, the laminated glazing 10 herein comprises two attachment parts 16, a first attachment part 16 located towards the front and a second attachment part 16 located towards the rear, respectively.

The first and second attachment parts 16 are for example formed by excrescences, separated from one another according to the longitudinal orientation.

Preferably, each of said first and second attachment parts 16 comprises at least one attachment hole 18.

In a variant not shown, only one of said first and second attachment parts 16 comprises an attachment hole 18, preferably the one of the attachment parts 16 that is located at the rear of the glazing 10.

According to this variant, the other attachment part 16 located at the front of the glazing 10 thus does not comprise an attachment hole 18 but engages with the attachment means to produce a connection of the first or second type described previously.

Thus, a single laminated glazing 10 can comprise different attachment means, in other words, according to the example, a connection of the first or second type at the front and a connection of the third type at the rear the attachment means of which pass through an attachment hole 18 of the glazing 10.

In a variant not shown, the laminated glazing 10 comprises a single attachment part 16, said attachment part 16 comprising for example at least one attachment hole 18, preferentially two attachment holes 18 separated from one another according to the longitudinal direction intended to receive attachment means for producing a connection of the third type as presented previously.

The number of part 16 for attaching the glazing 10 is, like the shape of the latter, determined based on the application, that is on the motor vehicle, in the same way that the number of attachment holes 18 is determined based on the drive device of the glazing.

As shown in FIGS. 1 to 4, the laminated glazing 10 comprises at least one outer glass sheet 20 and one inner glass sheet 30 which are assembled via an interlayer 40.

The laminated glazing 10 used herein as side glazing is delimited by a generally parallelepipedal-shaped perimeter.

The outer glass sheet 20 comprises an outer face 22 and an inner face 24, oriented towards the outside space E and towards the inside space I, respectively.

As shown in FIG. 1, the outer glass sheet 20 comprises consecutively an upper edge 21, a rear edge 23, a lower edge 25 and a front edge 27, said opposing upper edge 21 and lower edge 25 extending generally according to the longitudinal orientation and said opposing rear edge 23 and front edge 27 extending generally according to the vertical orientation.

The lower edge 25 of the outer glass sheet 20 has, centrally between two excrescences forming said attachment parts 16, a curved section forming a concave profile oriented downwardly.

Preferably, the outer glass sheet 20 comprises a through-hole 26 in each of said attachment parts 16, alternatively in at least one of said attachment parts 16.

Advantageously, the hole 26 of the outer glass sheet 20 is chamfered at one and/or the other of said faces, the outer face 22 and the inner face 24, respectively.

According to the type of the laminated glazing 10, symmetric or asymmetric, said at least one attachment part 16 is capable of being particularly made up of all or only part of the sheets that constitute said glazing 10.

The inner glass sheet 30 comprises an outer face 32 and an inner face 34, oriented towards the outside space E and towards the inside space I, respectively.

As shown in FIG. 2, the inner glass sheet 30 comprises consecutively an upper edge 31, a rear edge 33, a lower edge 35 and a front edge 37, said opposing upper edge 31 and lower edge 35 extending generally according to the longitudinal orientation and said opposing rear edge 33 and front edge 37 extending generally according to the vertical orientation.

The laminated glazing 10 shown in FIGS. 1 to 4 is a symmetric glazing, that is a glazing wherein the inner glass sheet 30 completely covers the outer glass sheet 20, said glass sheets having identical dimensions.

Figures 4, 5, 6, 7:
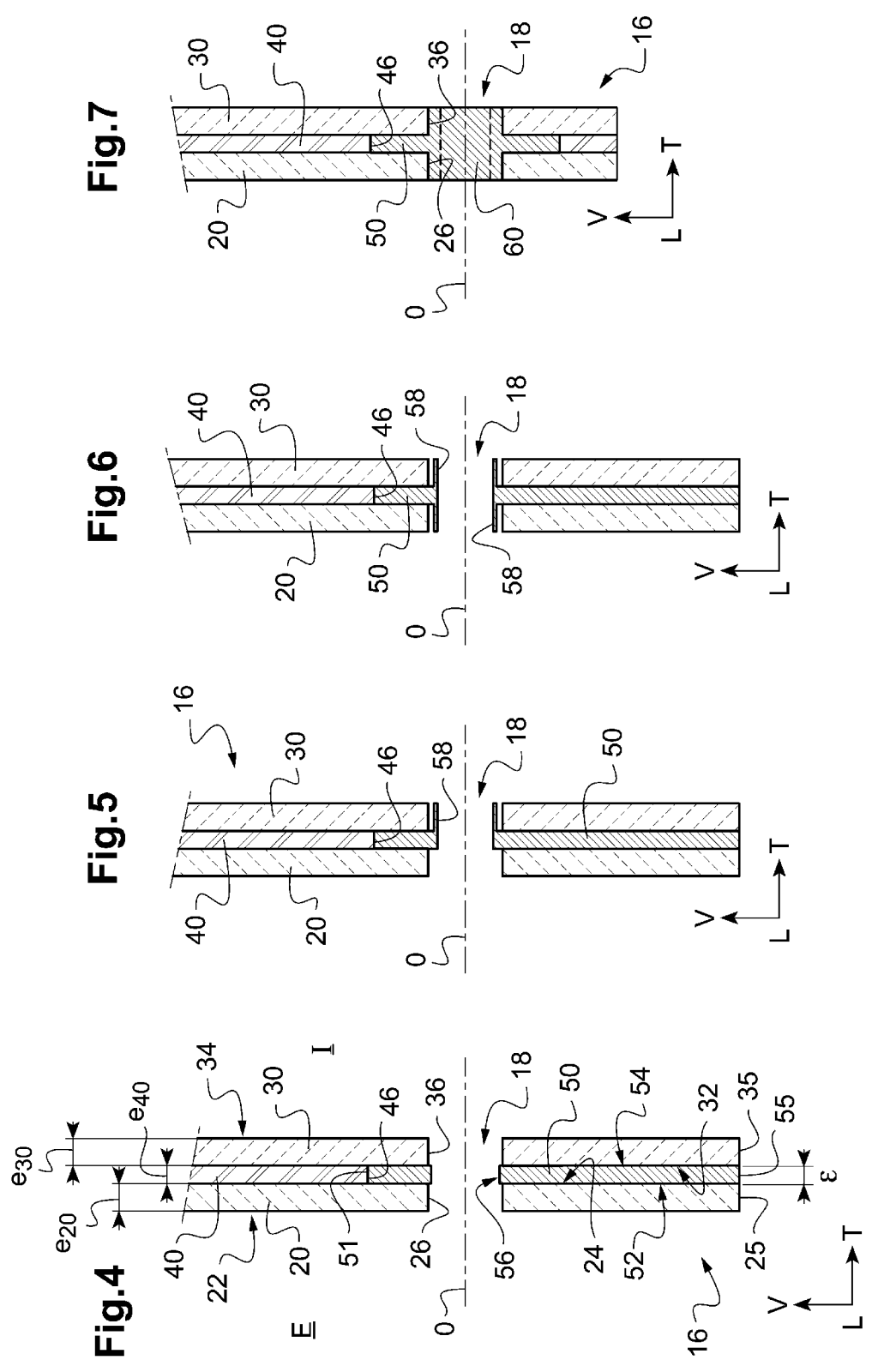

Thus, the parts 16 for attaching the glazing 10 are made up of the outer glass sheet 20, the interlayer 40 and the outer glass sheet 30 as shown in detail by the cross-section of FIG. 4 according to the plane IV-IV depicted in FIGS. 1 and 2.

Preferably, the outer glass sheet 20 and the inner glass sheet 30 herein have the same thickness, the outer glass sheet 20 having according to the transverse orientation a thickness "e20" which is equal to the thickness "e30" of the inner glass sheet 30.

Alternatively, the inner glass sheet 30 is thinner than the outer glass sheet 20, that is has a thickness "e30" smaller than the thickness "e20".

The lower edge 35 comprises a profile complementing that of the lower edge 25 of the outer glass sheet 20. Thus, the lower edge 35 of the inner glass sheet 30 has a centrally curved section forming a concave profile oriented downwardly.

Preferably, the inner glass sheet 30 comprises a through-hole 36 in each of said attachment parts 16, alternatively in at least one of said attachment parts 16.

Advantageously, the hole 36 of the inner glass sheet 30 is chamfered at one and/or the other of said faces, the outer face 32 and the inner face 34, respectively.

Advantageously, the hole 26 of the outer glass sheet 20 and the hole 36 of the inner glass sheet have an axis that is coaxial with the axis O of the hole 18 for attaching the glazing.

The interlayer 40 comprises at least one sheet of polymer material, the interlayer 40 connecting together the outer glass sheet 20 and the inner glass sheet 30 of the glazing 10.

In this first embodiment, the interlayer 40 comprises a single sheet of polymer material. Preferably, said sheet of polymer material forming the interlayer 40 is a sheet of polyvinyl butyral (PVB).

Alternatively, the interlayer 40 is a multilayer structure, that is it is made up of more than one sheet. The interlayer 40 comprises for example two sheets of polymer material such as a first sheet and a second sheet respectively of polyvinyl butyral (PVB) one of which advantageously has sound-deadening properties. This multilayer structure forming the interlayer 40 is also referred to as "bilayer."

The interlayer 40 may also comprise more than two sheets and for example be made up of three sheets of polymer material, or a "trilayer", comprising for example a sheet of polyethylene terephthalate (PET) disposed between two sheets of polyvinyl butyral (PVB) one of which advantageously has sound-deadening properties or else a sheet of polyvinyl butyral (PVB), which advantageously has sound-deadening properties, is disposed between two other sheets of polyvinyl butyral (PVB).

Figure 3:
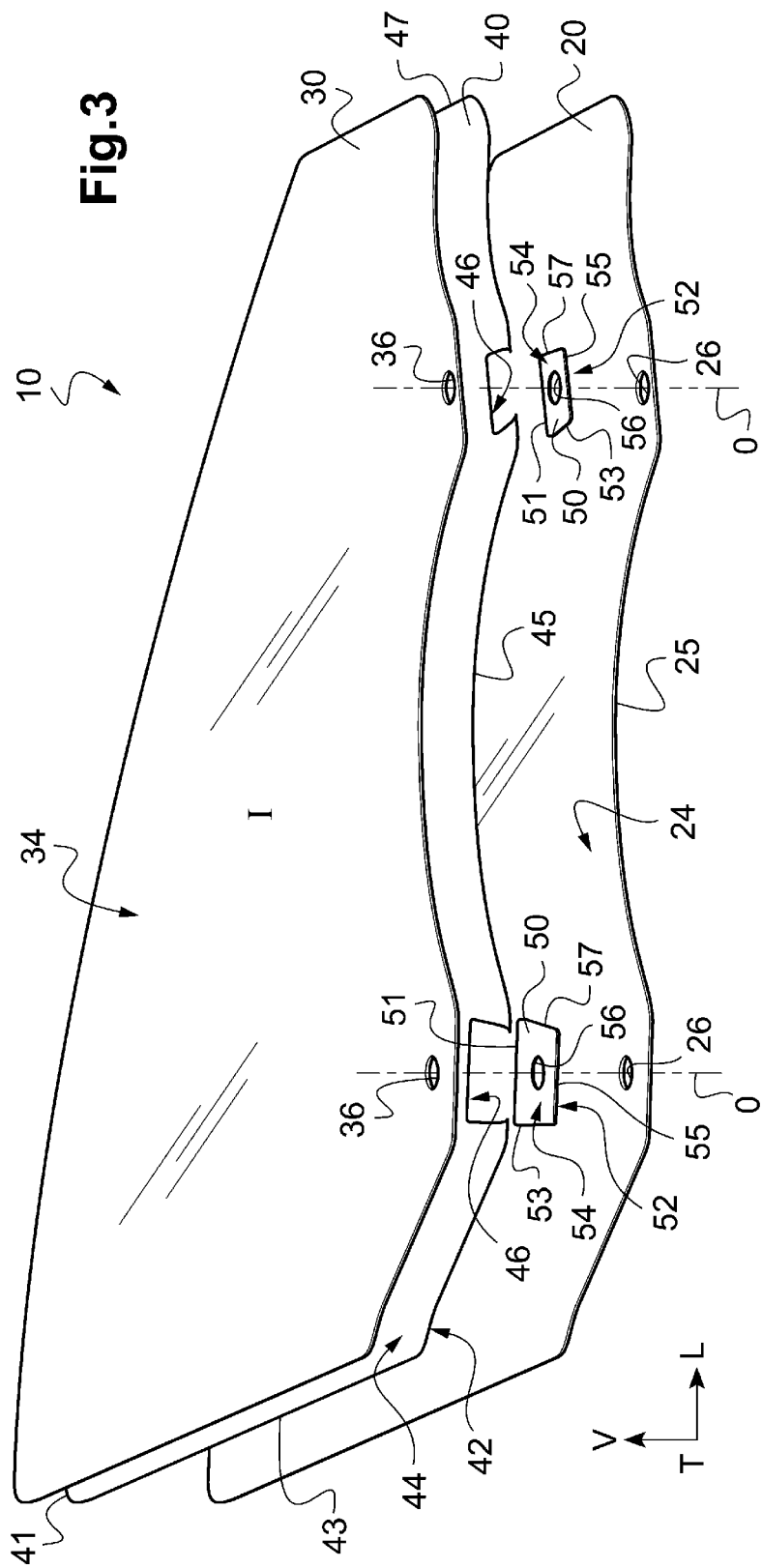
FIG. 3 is a perspective view which depicts, exploded, the laminated glazing according to the first embodiment of FIGS. 1 and 2 and which shows, at each of the front and rear parts for attaching the glazing, the cut-out provided in the sheet of polymer material of the interlayer and intended to receive the insert of complementary shape, said cut-out and the insert having a trapezoidal shape.
Figure 13:
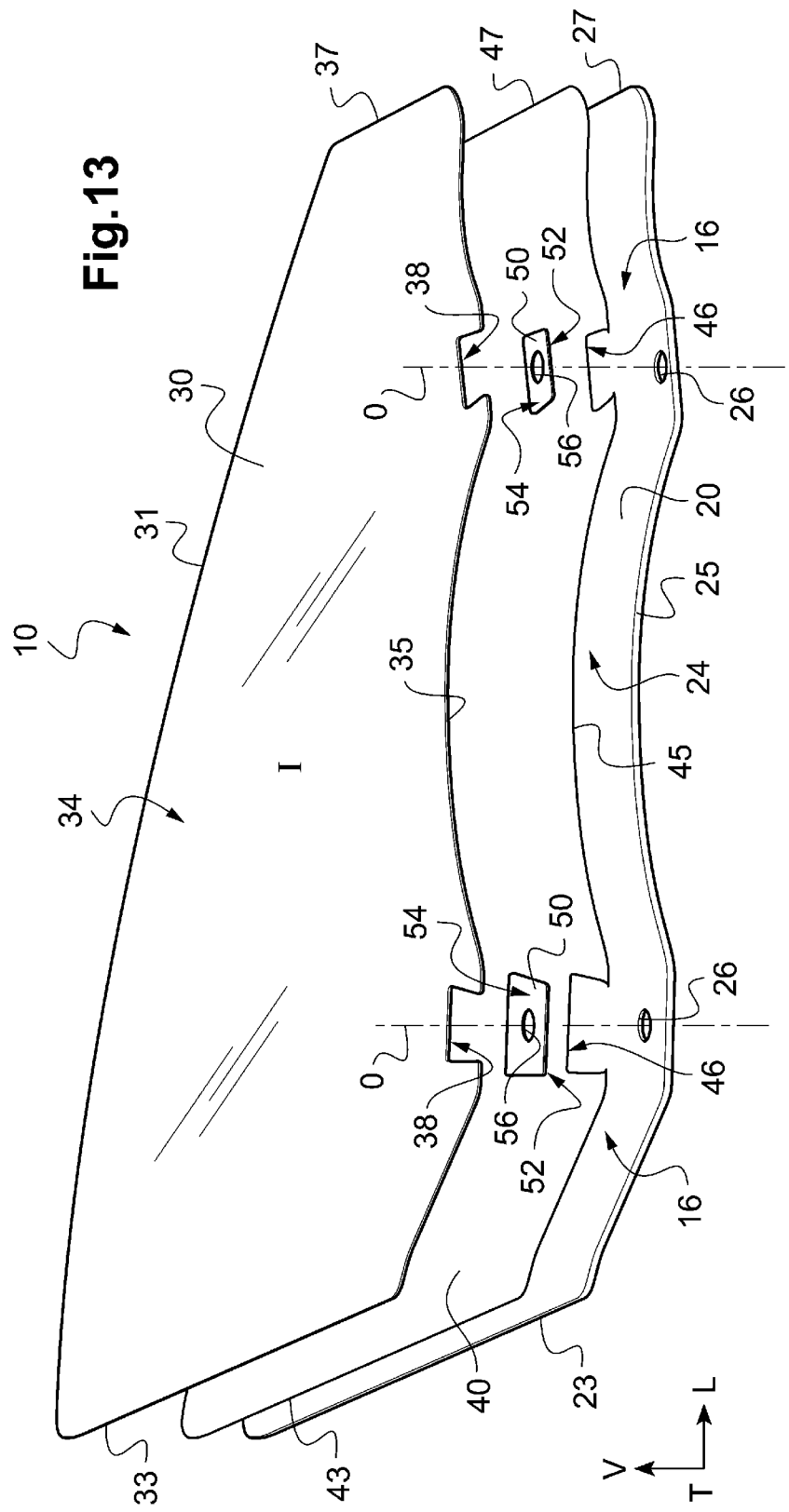
FIG. 13 is a perspective view which depicts, exploded, the laminated glazing according to the third embodiment of FIGS. 11 and 12 and which shows, at each of the front and rear parts for attaching the glazing, on the one hand the cut-out provided in the sheet of polymer material of the interlayer to receive the insert of complementary shape and, on the other hand, the cut-out provided in the inner glass sheet so that the clamping forces applied by the attachment means are applied to the insert.

As shown in FIG. 3, the interlayer 40 comprises an outer face 42 located opposite the inner face 24 of the outer glass sheet 20 and an inner face 44 located opposite the outer face 32 of the inner glass sheet 30.

The interlayer 40 comprises consecutively an upper edge 41, a rear edge 43, a lower edge 45 and a front edge 47, said opposing upper edge 41 and lower edge 45 extending generally according to the longitudinal orientation and said opposing rear edge 43 and front edge 47 extending generally according to the vertical orientation.

The interlayer 40 extends in the non-visible part 14, that is below the limit of visibility LV of the glazing 10.

The interlayer 40 comprises at least one cut-out 46 which is provided at the part 16 for attaching the glazing 10, said cut-out 46 being intended to receive an insert 50.

Advantageously, at least one part of the insert 50 is in contact with the interlayer 40, with the perimeter of the cut-out 46 provided in the interlayer 40 to receive same. In this first embodiment, the interlayer 40 comprises two cut-outs 46 which are arranged in the two front and rear attachment parts 16, respectively, of the glazing 10.

Preferably, the cut-out 46 has a shape open vertically downwardly, thus opening onto the lower edge 45 of the interlayer 40.

The interlayer 40 has a transverse thickness e40. Preferably, the thickness e40 of the interlayer is comprised between 0.3 mm and 1.2 mm.

The shape of the cut-out 46 of the interlayer 40 and that of the insert 50 are advantageously complementary so that at least one part of the perimeter of the cut-out 46 is in contact with the insert 50.

Alternatively, all of the insert 50 is in contact with the interlayer 40, the cut-out 46 then being a closed shape inside of which the insert 50 with complementary shape is housed, that is inserted.

Advantageously, the insert 50 thus avoids the risk of creep of the polymer material of said at least one sheet forming the interlayer 40 at least during the assembly of the outer glass sheet 20 and the inner glass sheet 30 via the interlayer 40 in order to obtain the laminated glazing 10.

Preferably, the insert 50 is housed in the cut-out 46 during the production of the glazing 10, that is before assembling the outer glass sheet 20 and the inner glass sheet 30 via the interlayer 40.

The interlayer 40 and the insert 50 can be independent elements, the interlayer 40 then being placed on one of the glass sheets 20, 30 followed by an insert 50 housed in each cut-out 46, before placing the other one of the glass sheets 20, 30 in order to finalize the pre-assembly.

Advantageously, the insert 50 and the interlayer 40 are connected together to form a unitary sub-assembly prior to the assembly with a view to obtaining the laminated glazing 10.

Preferably, the insert 50 and the interlayer 40 are connected by means of adhesive tape. By way of non-limiting example, a one-sided adhesive tape, particularly made of acrylic, is used, having a thickness of less than 0.5 mm, preferably less than 0.3 mm, even more preferably less than or equal to 0.15 mm.

Such a unitary sub-assembly formed by the interlayer 40 and herein by the two inserts 50 makes it possible to facilitate its placement between the outer glass sheet 20 and the inner glass sheet 30 during the pre-assembly and additionally guarantees the correct positioning of the insert 50 with respect to the cut-out 46 of the interlayer 40.

Preferably, the insert 50 is mainly made up of a planar part having a thickness "ε".

The thickness ε of the insert 50 is equal to more or less 10% of the thickness e40 of the interlayer 40, preferably equal to more or less 5% and even more preferentially to more or less 2% of said thickness e40.

Advantageously, the insert 50 is capable of forming a spacer suitable for limiting the creep of the polymer material of said at least one sheet of the interlayer 40, particularly during the assembly of the glazing 10 or subsequently due to the clamping forces applied by the attachment means.

Indeed, while in direct contact with the outer glass sheet 20 and the inner glass sheet 30, the insert 50 then guarantees dimensional stability over time particularly when compared to the polymer material of the interlayer 40 subject to creep due to the forces applied by the attachment means.

Preferably, the insert 50 is made of a plastic material or a metal material, for example steel, said material of the insert 50 having a hardness greater than that of said at least one sheet in polymer material of the interlayer 40.

Advantageously, the insert 50 is made of a plastic material, particularly polyamide (PA) for example PA 6-6, polyoxymethylene (POM) (also referred to as polyformaldehyde or polyacetal), polybutylene terephthalate (PBT), polyethylene terephthalate (PET).

Advantageously, the material of the insert 50 has a Shore D hardness that is comprised between 70 and 90.

As shown in FIG. 4, the insert 50 comprises an outer face 52 which is in direct contact with the inner face 24 of the outer glass sheet 20 and an inner face 54 which is in direct contact with an outer face 32 of the inner glass sheet 30.

Thus, the outer face 52 engages with the inner face 24 of the outer glass sheet 20 and the inner face 54 engages with the outer face 32 of the inner glass sheet 30 and does so without interposing any material between the insert 50 and said glass sheets 20, 30, in particular neither a polymer material of the interlayer 40 by virtue of the cut-out 46, or even glue for example.

Preferably, the outer face 52 and the inner face 54 of the insert 50 are planar to form a bearing surface for clamping by the attachment means, as are also the inner face 24 of the outer glass sheet 20 and the outer face 32 of the inner glass sheet 30.

In this first embodiment with a symmetric-type laminated glazing 10, the entire outer face 52 and inner face 54 are in contact with the inner face 24 of the outer glass sheet 20 and the outer face 32 of the inner glass sheet 30, respectively.

The outer face 52 and the inner face 54 of the insert 50 are for example smooth, so that each of said faces 52, 54 has a surface which is entirely and directly in contact with the inner face 24 or the outer face 54 of the glass sheet 20 or 30 located opposite.

Advantageously, the insert 50 according to the invention is not connected to the glazing by bonding contrary to the background art particularly according to the first type of connection, in particular with no bonding between the insert 50 and the outer glass sheet 20 and the inner glass sheet 30.

Advantageously, the insert 50 comprises de-airing means 150 (FIG. 16) which are configured to allow a discharge of the air contained in the interlayer 40 during the de-airing carried out during the assembly of the laminated glazing 10, that is of the outer glass sheet 20 and the inner glass sheet 30 via the interlayer 40.

Figure 16:
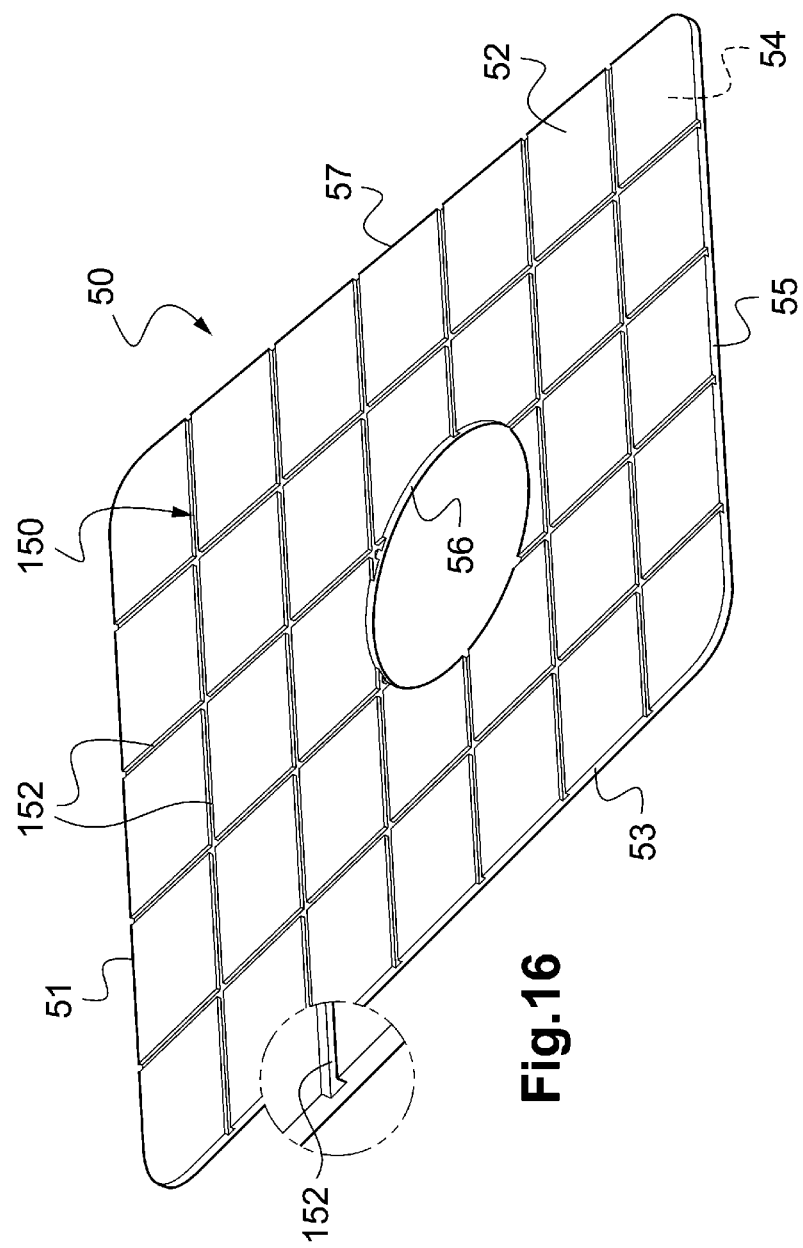
FIG. 16 is a perspective view which depicts an insert comprising de-airing means and which shows an exemplary embodiment of said de-airing means in the form of a network of lines provided in at least one of the faces of the insert, herein the outer face.

Preferably, the de-airing means 150 are produced in the outer face 52 and/or the inner face 54 of the insert 50, for example in the form of one or more lines 152 as shown in FIG. 16.

Alternatively, the de-airing means 150 are obtained by varying the roughness of the outer face 52 and/or the inner face 54 of the insert 50 which have for example an orange peel or golf ball appearance.

The de-airing means 150 are thus produced by recessing in the outer face 52 and/or the inner face 54 of the insert 50, as shown by one of the lines in a magnifying glass in FIG. 16.

The de-airing means 150 are arranged to discharge the air from the interlayer 40 towards the outside of the glazing 10, in particular by allowing the air to pass between the insert 50 on the one hand and the outer glass sheet 20 and the inner glass sheet 30, on the other hand.

Advantageously, the de-airing means 150 of the insert 50 are able to facilitate the discharge of the air contained in the polymer material of the interlayer 40 during the de-airing which takes place during the assembly of the glazing 10.

The insert 50 comprises consecutively an upper edge 51, a rear edge 53, a lower edge 55 and a front edge 57, said opposing upper edge 51 and lower edge 55 extending generally according to the longitudinal orientation.

As shown in FIG. 16, the lines 152 that constitute the de-airing means 150 form a grid, some extending between the upper edge 51 and the lower edge 55, the others between the rear edge 53 and the front edge 57.

Preferably, the rear edge 53 and the front edge 57 of the insert 50 extend in an oblique, non-parallel manner, generally according to the vertical orientation so that the insert 50 has a generally trapezoidal shape.

The external face 52 and the internal face 54 of the insert 50 extend parallel to the face located opposite, such as the inner face 24 of the outer glass sheet 20 for the external face 52 and the outer face 42 of the interlayer 40 for the internal face 54 according to the first embodiment.

The insert 50 comprises a hole 56 intended for having the means for attaching the glazing 10 with the drive device pass through same.

Preferably, the hole 56 is made in the insert 50 before the assembly of the laminated glazing 10, that is before assembling the outer glass sheet 20 and the inner glass sheet 30 via the interlayer 40 in order to obtain said laminated glazing 10, said interlayer 40 comprising at least one cut-out 46 receiving said insert 50.

Advantageously, the interlayer 40 has a cut-out with a shape complementing that of the insert 50 by virtue of which said insert 50 is in contact with the interlayer 40 over all or part of its perimeter, herein all of its edges 51, 53 and 57 with the exception of the lower edge 55 since the inverted U-shaped cut-out 46 is open downwardly.

Alternatively, the hole 56 is made after assembling the laminated glazing 10.

If such a variant involves performing an operation of boring the hole 56 after the assembly of the glazing 10, better precision in the positioning of said hole 56 is conversely capable of being obtained since the insert 50 occupies a final position with respect to the interlayer 40 as well as to the glass sheets 20, 30.

Advantageously, the hole 56 of the insert 50 is centered on the axis O of the attachment hole 18, said axis O constituting a reference axis particularly for attaching the means for attaching the glazing 10.

Preferably, the hole 56 of the insert 50 has a diameter that is comprised between 10 mm and 25 mm.

Advantageously, the insert 50 comprises at least one part that does not extend parallel to the vertical direction so as to have at least one holding surface that is suitable for retaining it vertically in position by cooperation of shapes with the interlayer 40, the insert 50 being in contact by its edges 51, 53, 57 with said interlayer 40.

In the first embodiment, the insert 50 has for example a trapezoidal shape, said insert 50 being oriented so that the upper end is the widest, by virtue of which the holding surface is formed by the oblique front 53 and rear 57 edges of the insert 50.

Advantageously, the holding surface of the insert 50 thus defined with the interlayer 40 helps to retain the laminated glazing 10 by opposing the forces of vertical orientation.

In use, the laminated glazing 10 is connected to the drive device by attachment means arranged to pass through the attachment hole 18 of one of the attachment parts 16 for attaching the glazing, or consecutively the hole 26 of the outer glass sheet 20, the hole 56 in the insert 50 and the hole 36 in the inner glass sheet 30 which constitute said attachment hole 18.

The insert 50 may however have many shapes capable of being suitable for obtaining such a holding surface, not parallel to the vertical orientation, engaging with its complementary surface in the notch 46 of the interlayer 40.

Alternatively and in a non-limiting manner, said holding surface of the insert 50 belongs to a part that projects according to the longitudinal direction with respect to the rest of the insert 50, for example the upper bar of a generally T-shaped insert housed in a complementary notch 46.

Advantageously, the insert 50 thus helps to retain the glazing 10 in the event of one or more crashes leading to a breakage of the glass.

Alternatively, the insert 50 does not comprise a specific holding surface and has, for example, like the cut-out 46, a rectangular or square shape.

Advantageously, a laminated glazing 10 comprising at least one insert 50 according to the invention additionally makes it possible to optimize the transmission of clamping forces, particularly those applied by the attachment means.

Advantageously, the risks of creep of the polyvinyl butyral (PVB) of the interlayer 40 are limited not only during the assembly of the laminated glazing 10 but also and especially afterwards during its use, by virtue of which better stability of the laminated glazing 10 over time is obtained.

According to a first alternative embodiment of the insert 50 shown by FIG. 5, the insert 50 comprises at least one bushing 58 which, extending according to the axis O, projects transversely with respect to the rest of the insert 50 positioned between the outer glass sheet 20 and the inner glass sheet 30.

Preferably, the bushing 58 has a cylindrical shape, circumferentially delimiting the hole 56 of the insert 50, said bushing 58 being circumferentially continuous.

Advantageously, the bushing 58 is configured to pass through at least part of the inner glass sheet 30 provided with the hole 36.

Preferably, the bushing 58 is configured to pass through the entire inner glass sheet 30 so as to protect said sheet 30 with respect to the attachment means intended to be received in the attachment hole 18 of the glazing 10 partially formed by the hole 36 that said inner glass sheet 30 comprises.

Alternatively, the bushing 58 is configured to pass through all or at least part of the outer glass sheet 20 provided with the hole 26 so as to protect said outer glass sheet 20 at the attachment hole 18.

Thus, the bushing 58 can extend on either side of the insert 50, that is towards the outer glass sheet 20 or towards the inner glass sheet 30. Alternatively, the bushing 58 extends advantageously on either side of the insert 50.

Advantageously, the bushing 58 of the insert 50 makes it possible to protect the glass sheets 20, 30 of the glazing 10 at the holes but also to precisely position the attachment means with respect to the glazing 10, or with respect to the axis O of the attachment hole 18.

Preferably, the hole 26 of the outer glass sheet 20 and the hole 36 of the inner glass sheet 30 have a diameter which is larger than the diameter of the hole 56 of the insert 50, with or without a bushing 58.

The position of the attachment means in the part 16 for attaching the glazing 10 is determined by the bushing 58 of the insert 50, that is independently of the mismatch that may exist between the axis of the hole 26 of the outer glass sheet 20 and the axis of the hole 36 of the inner glass sheet 30.

Advantageously, the attachment means engage with the bushing 58 so that the forces are taken up by the insert 50 and not directly by the glass sheets 20, 30 of the glazing 10.

When the insert 50 comprises a bushing 58, the outer glass sheet 20 and the inner glass sheet 30 of the glazing 10 are advantageously devoid of chamfer(s) at the holes 26 and/or 36 which eliminates one operation and reduces the manufacturing costs.

Advantageously, the hole 26 in the outer glass sheet 20 and the hole 36 in the glass sheet 30 are produced before the assembly in order to obtain said laminated glazing 10.

According to a second alternative embodiment of the insert 50 shown by FIG. 6, the insert 50 comprises at least one bushing 58 which, following the axis O, extends on either side of the main vertical orientation plane of the insert 50.

Advantageously, the bushing 58 of the insert 50 is configured to pass through at least one part, preferably all of, the outer glass sheet 20 provided with the hole 26 and at least one part, preferably all of, the inner glass sheet 30 provided with the hole 36 so as to protect the or said glass sheets 20, 30 at the attachment hole 18.

Advantageously, the bushing 58 of the insert 50 is capable of transversely forming a spacer for the attachment means intended to apply a clamping force at said at least one part 16 for attaching the glazing 10.

Advantageously, the position of the attachment means is determined by the bushing 58 of the insert 50 delimiting the hole 56 by virtue of which the incidence of a mismatch is avoided as previously between the axis of the hole 26 of the outer glass sheet 20 and the axis of the hole 36 of the inner glass sheet 30.

According to a third alternative embodiment of the insert 50 shown by FIG. 7, the insert 50 does not initially comprise a hole 56 but does comprise a core 60. As shown in FIG. 7, the core 60 is for example initially completely solid.

Advantageously, the core 60 is made as a single part, formed integral, with the insert 50. The core 60 is for example obtained by molding with the insert 50, made of plastic or metal material.

Alternatively, the core 60 is a part separate from the insert 50 and the core 60 is capable of being rigidly connected to said insert 50.

Preferably, the core 60 of the insert 50 projects with respect to one and the other of the outer 52 and inner 54 faces of the insert 50.

The core 60 is intended, after assembling said sheets 20, 30 of the glazing 10, to be bored so as to subsequently form the hole 56 intended to receive the attachment means and to advantageously obtain a bushing 58 analogous to that described previously in reference to FIG. 6.

With an insert 50 according to this third alternative embodiment, the hole 56 is thus formed in the core 60 of the insert 50 after assembling said sheets 20, 30 of the glazing 10.

Advantageously, the hole 56 has a diameter with a value that is determined selectively as a function particularly of the attachment means by virtue of which it is possible to standardize at least the insert 50 provided with the core 60.

The insert 50 is capable of being used with at least first attachment means for which a hole 56 having a first diameter will be made in the core 60 and with second attachment means for which a hole 56 having a second diameter will be made in the core 60.

The material thickness forming the bushing 58 of the insert 50 is therefore capable of varying over a range of values determined by minimum and maximum diameters, respectively, of the hole 56.

In the first embodiment which has been described in reference to FIGS. 1 to 4 as well as the alternative embodiments of the insert 50 of FIGS. 5 to 7, the laminated glazing 10 is advantageously a symmetric glazing.

According to the invention, the glazing 10 comprises an insert 50 provided with at least one hole 56 which is arranged in each of the attachment parts 16 thanks to a cut-out 46 provided in the interlayer 40.

Each attachment part 16 comprises, respectively, at the attachment hole 18, the outer glass sheet 20, the insert 50 and the inner glass sheet 30, said insert 50 being interposed transversely between said sheets 20, 30.

Thus, the attachment part 16 offers good rigidity, particularly at the attachment hole 18, by virtue of which the risk of breakage of the laminated glazing 10 is limited.

However, the invention is not in any way limited to such a symmetric glazing 10 and can also be applied to an asymmetric laminated glazing 10.

In such an asymmetric-type laminated glazing 10, said at least one part 16 for attaching the glazing 10 comprises at least the outer glass sheet 20 and the insert 50, not covered by the inner glass sheet 30.

As shown by FIGS. 8 and 9, the inner glass sheet 30 comprising a lower edge 35 extending longitudinally in a rectilinear manner is indeed shorter than the outer glass sheet 20 forming said part 16 for attaching the glazing 10.

Preferably, the interlayer 40 has a shape identical to that of the inner glass sheet 30 so as not to cover the parts 16 for attaching the glazing 10.

Advantageously, the interlayer 40 comprises a sheet of polymer material, preferably of polyvinyl butyral (PVB).

In an alternative embodiment not shown, the interlayer is a multilayer structure comprising more than one sheet, for example two or three sheets, the cut-out 46 is then made in all or at least part of said sheets forming the interlayer 40.

In such a variant, the outer face 52 of the insert 50 is capable of engaging with a face other than the inner face 24 of the outer glass sheet 20 and/or the inner face 54 with a face other than the outer face 32 of the inner glass sheet 30, that is one and/or the other can engage with one face of one of the adjacent sheets forming said multilayer interlayer.

Compared to a glazing 10 according to the first embodiment, the asymmetric-type laminated glazing 10 according to this second embodiment comprises attachment parts 16 generally having less thickness, which may limit the interchangeability thereof.

According to one variant shown in FIG. 10, the insert 50 is configured to compensate for the absence of the inner glass sheet 30, which herein is shorter and does not cover the entire insert 50.

Advantageously, the insert 50 does not have a constant thickness (as shown in FIG. 9) but is transversely stepped so that the laminated glazing 10 has a uniform thickness, including in said attachment parts 16.

The insert 50 comprises a first part which is interposed between the outer glass sheet 20 and the inner glass sheet 30 and a second part which, having a thickness greater than that of the first part, is configured to extend under the inner glass sheet 30.

Preferably, the first part of the insert 50 thus has a thickness matching that of the interlayer 40 and the second part of the insert 50 has a thickness matching that of the interlayer 40 and of the inner glass sheet 20.

Advantageously, the insert 50 comprises a shoulder at the junction between the first part and the second thicker part which is intended to engage with the edge 35 of the inner glass sheet 20.

Preferably, the insert 50 comprises de-airing means 150 as previously described for the first embodiment, said de-airing means 150 then being preferably arranged only on the outer face 52 of the insert 50 engaging with the inner face 24 of the outer glass sheet 20.

In an asymmetric-type laminated glazing 10 according to this second embodiment, the attachment parts 16 have a rigidity that is mainly determined by the outer glass sheet 20 and by the insert 50. Thus, the insert 50 reinforces the strength of the laminated glazing 10 in the attachment part 16, independently of the thickness of the outer glass sheet 20 which may be greater than or equal to the thickness of the inner glass sheet 30.

According to a third embodiment shown in FIGS. 11 to 15, the inner glass sheet 30 comprises at least one cut-out 38 provided at the level of the part 16 for attaching the laminated glazing 10 so that the attachment means engage with the faces 52 and 54 of the insert 50 and without being in contact with said inner glass sheet 30.

Advantageously, no clamping force is thus applied directly onto the inner glass sheet 30 by the attachment means.

The third embodiment is more particularly advantageous when the thickness e30 of the inner glass sheet 30 is such that there exist risks of it breaking due to its characteristics of mechanical behavior, particularly of limited resistance.

By way of non-limiting example, the outer glass sheet 20 has a thickness e20 of 3.5 mm, the sheet of the interlayer 40 has a thickness e40 of 0.76 mm and the inner glass sheet 30 a thickness e30 of 1.6 mm.

Preferably and as shown by FIG. 14, the cut-out 38 of the inner glass sheet 30 has dimensions smaller than those of the insert 50 so that the insert 50 engages around said cut-out 38 with a part of the outer face 32 of the inner glass sheet 30.

As shown by FIG. 14, a strip having a width "l" extends preferably over the entire perimeter of the notch 38 provided in the inner glass sheet 30.

Advantageously, the insert 50 has a trapezoidal shape that complements that of the cut-out 46 of the interlayer 40, or is analogous to that of the first embodiment.

The invention claimed is:

1. A laminated glazing for a motor vehicle, comprising:
    an outer glass sheet and an inner glass sheet assembled by an interlayer which comprises at least one sheet of polymer material,
    at least one attachment part for attaching the laminated glazing and provided with at least one attachment hole which has an axis and passes through at least the outer glass sheet, said attachment hole being intended to receive an attachment system to attach said laminated glazing with a drive device, and
    at least one insert which, comprising a hole, is housed in a complementary cut-out provided in the interlayer, at the attachment part such that at least portion of the at least one insert is sandwiched between the outer glass sheet and the inner glass sheet.

2. The laminated glazing according to claim 1, wherein the insert comprises an outer face which is in direct contact with an inner face of the outer glass sheet and an inner face of which all or at least one part is in direct contact with an outer face of the inner glass sheet.

3. The laminated glazing according to claim 1, wherein the insert is made of a material having a hardness greater than that of the interlayer comprising at least said sheet of polymer material.

4. The laminated glazing according to claim 1, wherein said insert is made of a plastic material, or a metal material.

5. The laminated glazing according to claim 1, wherein the hole is formed in the insert after assembly of said outer and inner glass sheets of the laminated glazing.

6. The laminated glazing according to claim 1, wherein the hole of the insert has a diameter between 10 mm and 30 mm.

7. The laminated glazing according to claim 1, wherein the insert comprises a bushing which, extending along the axis O, is configured to pass through at least one part of the outer glass sheet provided with a hole and/or of the inner glass sheet provided with a hole.

8. The laminated glazing according to claim 7, wherein the insert comprises a core projecting with respect to one and/or the other of an outer and an inner faces of the insert, said core being intended to be bored so as to form the bushing which said hole passes through, preferentially bored after assembly of said outer and inner glass sheets of the laminated glazing.

9. The laminated glazing according to claim 1, wherein the insert has a thickness that is equal to a thickness of the interlayer+/−10%.

10. The laminated glazing according to claim 1, wherein the insert is configured to form a spacer between the outer glass sheet and the inner glass sheet so as to limit creep of the polymer material of said at least one sheet of the interlayer.

11. The laminated glazing according to claim 1 wherein the inner glass sheet comprises at least one cut-out provided in the attachment part for attaching the laminated glazing so that the attachment system engages with the insert without contact with said inner glass sheet.

12. The laminated glazing according to claim 11, wherein the cut-out of the inner glass sheet has dimensions smaller than those of the insert so that the insert engages around said cut-out with a part of an outer face of the inner glass sheet.

13. The laminated glazing according to claim 1, wherein the insert comprises at least one part configured to form a holding surface capable of retaining the insert vertically in position.

14. The laminated glazing according to claim 1, wherein the laminated glazing is symmetric, said at least one attachment part for attaching the glazing comprising the outer glass sheet, the insert and the inner glass sheet.

15. The laminated glazing according to claim 1, wherein the insert comprises de-airing means configured to allow a discharge of the air contained in the interlayer during assembly of the laminated glazing.

16. The laminated glazing according to claim 1, wherein the laminated glazing is a side glazing that is slidably mounted in a door of the motor vehicle.

17. The laminated glazing according to claim 3, wherein the sheet of polymer is a sheet of polyvinyl butyral (PVB).

18. The laminated glazing according to claim 3, wherein the material of the insert has a Shore D hardness between 70 and 90.

19. The laminated glazing according to claim 4, wherein said plastic material is polyamide (PA), polyoxymethylene (POM), polybutylene terephthalate (PBT), or polyethylene terephthalate (PET) and said metal material is steel.

20. The laminated glazing according to claim 6, wherein the hole of the insert has a diameter between 15 mm and 25 mm.

* * * * *